June 13, 1961 M. PAGLIANO 2,988,076
APPARATUS FOR DIRECT INJECTION OF LIGHT
FUEL INTO INTERNAL-COMBUSTION ENGINES
Filed Oct. 23, 1959

INVENTOR:-
MARIO PAGLIANO

United States Patent Office 2,988,076
Patented June 13, 1961

2,988,076
APPARATUS FOR DIRECT INJECTION OF LIGHT FUEL INTO INTERNAL-COMBUSTION ENGINES
Mario Pagliano, 1 Via San Michele, Turin, Italy
Filed Oct. 23, 1959, Ser. No. 848,285
Claims priority, application Italy Mar. 17, 1959
3 Claims. (Cl. 123—139)

The purpose of the present invention is to provide an apparatus for the direct injection of light fuel, e.g. gasoline, into internal-combustion engines, particularly for motor-vehicles, in which said apparatus there are interposed between the fuel and the injection-pump one or more fluids which are not mutually miscible and which are subjected to an equal pressure and which can be compressed by the pump in order to transmit the pressure hydraulically to an intermediate moving organ of which the function is to receive the fuel and inject it into the engine.

In one possible form of construction, the apparatus consists of a container accommodating a receptacle with resilient walls influenced by a liquid, e.g. oil, which is present between the internal walls of the container and external walls of the resilient receptacle and subjected to the action of a pump; the said receptacle, of which the expansion, brought about by an auxiliary valve, closes the access-orifice for the oil in the container, being intended to receive the fuel under pressure via a feed-valve which closes when the receptacle is subjected to pressure from the compressed oil surrounding it, while the fuel is injected through the injector into the engine.

In another form of construction the container and the internal resilient receptable referred to in the preceding paragraph are replaced by a U-shaped container, partially filled with mercury and separating the oil from the fuel, one branch of the container having a cylindrical float with a central boring, against the bases of which rest two springs: The upper spring bears, suspended, a valve for the interception of oil conveyed to the container by the pressure of the pump and through another valve, the re-charging valve, while the lower spring is immersed in the mercury; the function of the other branch of the container is to receive the fuel under pressure through a further valve, the feed-valve, which closes when the fuel is subjected to pressure, the fuel being injected into the engine through the injector by the mercury, which in its turn receives the thrust of the oil via the pump.

The apparatus provided by the invention offers the advantage that the fuel is conveyed to the engine direct, that is to say, without coming in contact with the moving parts of the apparatus subject to wear, as the compression-pump acts direct on the oil as a hydraulic control-fluid for the injection of the fuel.

Other advantages will emerge in the course of the following description, which, when studied in conjunction with the accompanying drawing, provided as an example and without any limitative effect, will make it clear how the present invention can be operated, the particular features emerging both from the text and from the drawing naturally forming an integral part of the said invention.

Figure 1:
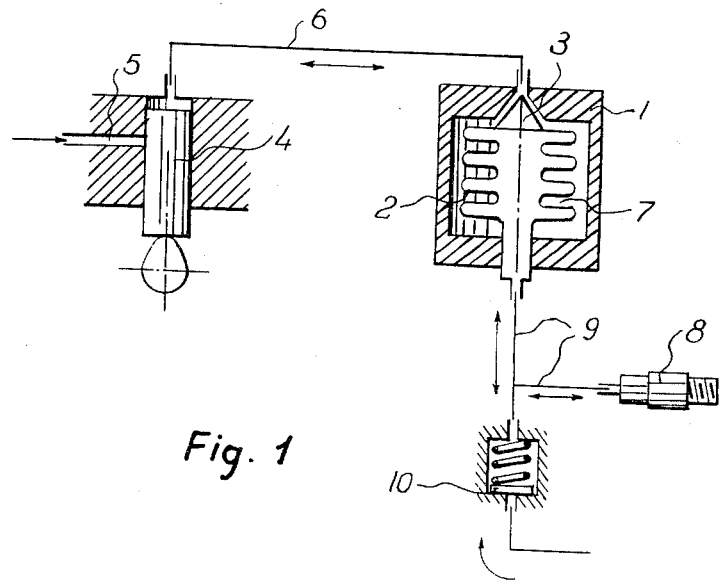
FIG. 1 is a schematic diagram of the apparatus in accordance with the first form of construction.

With reference to the first form of construction (FIG. 1), 1 indicates a cylindrical container enclosing a receptacle 2, with resilient walls arranged in the form of a cylindrical bellows, one part being affixed to the container 1 and the other part opposite bearing a cut-off valve 3 for the oil supplied from the pump 4 through the suction-orifice 5 and the tubing 6 and eventually occupying the gap 7 between the internal wall of the container 1 and the external wall of the receptacle 2. That part of the resilient receptacle 2 which is affixed to the container communicates with the injector 8 through the tubing 9 and with the feed-valve 10 of the fuel under pressure.

When the suction orifice 5 of the pump 4 closes, the fuel begins to be conveyed, because the pressure exerted on the oil at 6 is transmitted to the valve 3, which, on opening, compresses the receptacle 2 until it reaches and exceeds the pressure exerted by the fuel on the internal walls of the receptacle 2, then injecting it into the engine through the injector 8.

During the suction-phase of the oil, at the pump 4, the resilient receptacle 2 expands under the effect of its own elasticity, and the feed-valve 10, acted on by the pressure of the fuel, opens; the internal and external pressures of the resilient receptacle 2 cancelling one another out, the valve 3 will close.

The function of the orifice 5 of the pump 4 is to enable the oil lost through the movement of the pump-piston to be replenished, and the feed both of the fuel and of the oil is always effected by pressures.

Figure 2:
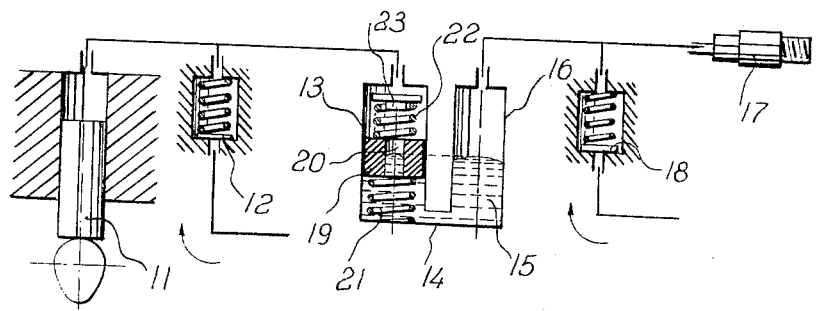
FIG. 2 is a schematic diagram of the apparatus in accordance with another method of operation.

In the second form of construction (FIG. 2), the fuel is conveyed to the injector by means of an intermediate hydraulic fluid, the same result being obtained as in the form of construction illustrated in FIG. 1.

11 indicates the pump, of which the admission-orifice 5 for the oil (FIG. 1) is replaced by the valve 12, and the pump and the valve communicate with each other and with a branch 13 of a U-shaped container 14, partially filled with mercury 15, while the other branch 16 communicates both with the injector 17 and with a feed-valve 18 for the fuel under pressure. In the branch 13, at the level of the mercury 15, is situated a cylindrical float 19, having a central boring 10, against the bases of which said float rest two springs 21 and 22, the upper spring 22 supporting the cut-off valve 23 for the oil.

Assuming that the branch 13, above the float 19, contains the oil which communicates with the pump 11 and the valve 12, and that the branch 16 contains the fuel, separated from the mercury 15, the method of operation is as follows:

The fuel feed valve 18 and the oil re-charging valve 12 are closed during the delivery-phase of the pump 11 (FIG. 2), so that the pressure imparted by the pump to the oil is transmitted to the mercury 15 and consequently to the fuel, which is injected into the engine. During the suction-phase of the pump 11, additional fuel will be drawn in through the feed-valve 18, while the valve 12 will not open, as it is subject to a greater degree of spring-loading than valve 18. During this phase of suction of the fuel into the branch 16 of the container 14, assuming that there are oil-losses past the pump-piston during its pressure stroke, the level of the mercury 15 will tend to become higher in the branch 13, the volume of oil caused to move back being greater than the volume of oil displaced by the pump. To prevent this happening, valve 23 closes after a predetermined portion of the down stroke of piston 11 has taken place, whereby fresh oil is drawn in through valve 12 to replenish the loss. The level of the mercury is maintained in the following manner: the valve 23, thrust against its seating by the increase in the level of the mercury 15 in the branch 13 during the down stroke of the piston 11, is thrust back again during the oil-delivery phase, and consequently the pressure is transmitted to the spring 22, the float 19 and the spring 21, so that the entire assembly is immersed in the mercury until the spring 21 has touched the base and undergone deformation. But owing to the hydrostatic thrust of the mercury and to the elasticity of the springs, the entire assembly will tend to return upwards so that, as soon as the feed stroke movement of oil ceases, the valve 23 shuts off the communication with the branch 13.

The kinematics of the float system are such that the float acts at just the right moment to prevent the feed valve 18 from functioning until it has become stabilised at a normal level.

The apparatus provided by the present invention thus solves the problem of the lubrication of the parts in motion, since oil plays a part in the operation of these latter. It is also possible for the feed to be effected to a number of cylinders with one single pump.

I claim:

1. In a liquid-fuel injection system for internal combustion engines, fuel injector means, non-return valve means coupled to the injector means for passage to the latter of liquid fuel from a supply, a housing having a movable element therein dividing the interior of the housing into two chambers sealed off in liquid-tight manner each from the other, one of said chambers being in communication with the injector means and being filled with liquid fuel, a piston and cylinder pump having the outlet of its cylinder connected to the other chamber, said cylinder and associated chamber being liquid filled, means for entry of replenishing liquid into said cylinder and associated chamber, non-return valve means positioned in the housing to act between the cylinder and associated chamber such that said valve means are moved into closed condition by the movable element during return strokes of the piston.

2. In a liquid-fuel injection system for internal combustion engines, fuel injector means, non-return valve means coupled to the injector means for passage to the latter of fuel from a supply, a housing having a flexible bellows therein serving to divide the interior of the housing into two chambers sealed off in liquid-tight manner each from the other, a first such chamber constituted by the interior of the bellows being in communication with the injector means and being filled with liquid fuel, a piston and cylinder pump having an outlet of its cylinder connected to the other such chamber constituted by that part of the interior of the housing external of the bellows, said cylinder and associated chamber being liquid-filled, means for entry of replenishing liquid into said cylinder and associated chamber, a valve seating in the housing, and a valve member carried on the flexible bellows and positioned so as, when the bellows expand during return strokes of the piston, to engage onto the seating and prevent return flow from the associated chamber to the cylinder.

3. In a liquid-fuel injection system for internal combustion engines, fuel injector means, first non-return valve means coupled to the injector means for passage to the latter of liquid fuel from a supply, a housing, a movable body of non-miscible liquid in said housing serving to divide the housing into two chambers sealed off in liquid-tight manner each from the other, one of said chambers being in communication with the injector means and being filled with liquid fuel, a piston and cylinder pump having the outlet of its cylinder connected to the other chamber, said cylinder and associated chamber being liquid filled, a second non-return valve means connected to the cylinder and associated chamber for entry of replenishing liquid thereto, a valve seating in the housing, and a float carrying a valve member and disposed in the associated chamber, said float being lifted by the body of non-miscible liquid during return strokes of the piston so as to engage the valve member onto the seating and prevent return flow from the associated chamber to the cylinder.

References Cited in the file of this patent
UNITED STATES PATENTS

| | | |
|---|---|---|
| 2,046,491 | Scott | July 7, 1936 |
| 2,852,014 | Pascke et al. | Sept. 16, 1958 |

FOREIGN PATENTS

| | | |
|---|---|---|
| 50,540 | France | June 11, 1940 |
| | (Addition to No. 853,375) | |
| 1,021,742 | France | Dec. 3, 1952 |